United States Patent
Kim et al.

(10) Patent No.: US 7,423,086 B2
(45) Date of Patent: *Sep. 9, 2008

(54) ETHYLENE-PROPYLENE-DIENE RUBBER COMPOSITION WITH IMPROVED ADHESION PROPERTIES

(75) Inventors: Sang Bae Kim, Yeosu (KR); Gyu Yeop Lee, Yeosu (KR)

(73) Assignee: Kumho Polychem Co., Ltd., Jongro-Gu, Seoul ( * ) Notice: Subject to any disclaimer, the term of this patent is extended or adjusted under 35 U.S.C. 154(b) by 294 days.

This patent is subject to a terminal disclaimer.

(21) Appl. No.: 11/030,580

(22) Filed: Jan. 6, 2005

(65) Prior Publication Data
US 2005/0197453 A1 Sep. 8, 2005

(30) Foreign Application Priority Data
Jan. 9, 2004 (KR) ...................... 10-2004-0001670

(51) Int. Cl.
*C08F 8/00* (2006.01)
*C08L 9/00* (2006.01)
*C08L 23/00* (2006.01)
*C08L 23/04* (2006.01)

(52) U.S. Cl. .................. 525/191; 525/232; 525/240
(58) Field of Classification Search ................ 525/210, 525/232, 240, 191
See application file for complete search history.

(56) References Cited

U.S. PATENT DOCUMENTS

| 6,177,516 | B1 * | 1/2001 | Hudak | 525/71 |
| 6,221,928 | B1 * | 4/2001 | Kozma et al. | 521/86 |
| 6,921,792 | B2 * | 7/2005 | Kim et al. | 525/236 |

\* cited by examiner

*Primary Examiner*—Nathan M Nutter
(74) *Attorney, Agent, or Firm*—Knobbe, Martens, Olson & Bear LLP

(57) ABSTRACT

Disclosed herein is an ethylene-propylene-diene EPDM rubber composition with improved adhesion properties. The ethylene-propylene-diene rubber composition comprises an EPDM rubber, a crystalline polyolefin, and a polyolefin containing at least one carbonyl group (—C═O) within the structure as an adhesion improver. The ethylene-propylene-diene rubber composition improves adhesion to a polar polymeric material. Specifically, the EPDM rubber composition comprises 100 phr of an EPDM rubber, 5~40 phr of a polyolefin containing at least one carbonyl group and 10~30 phr of a crystalline polyolefin resin.

6 Claims, 1 Drawing Sheet

ETHYLENE-PROPYLENE-DIENE RUBBER COMPOSITION WITH IMPROVED ADHESION PROPERTIES

RELATED APPLICATIONS

This application claims the benefit of priority of a Korean patent Application No. 2004-1670, filed Jan. 9, 2004.

1. Field of the Invention

The present invention relates to an ethylene-propylene-diene (EPDM) rubber composition with improved adhesion properties, and more particularly to an ethylene-propylene-diene rubber composition with improved adhesion properties which comprises an EPDM rubber, a crystalline polyolefin, and a polyolefin containing at least one carbonyl group (—C=O) within the structure as an adhesion improver. Since the ethylene-propylene-diene rubber composition is polar due to the presence of the carbonyl group, it improves adhesion to polar polymeric materials, resulting in improved coating and adhesion properties of rubber parts and extruded products, and satisfying the requirement of weight saving of rubber parts for use in industrial applications, including automobiles.

2. Description of the Related Art

Generally, ethylene-propylene-diene rubbers are non-polar rubber materials containing no double bonds in their backbone, and have superior weather resistance, ozone resistance, thermal stability and electrical properties. Based on these characteristics, ethylene-propylene-diene rubbers are widely used as raw materials of rubber parts in a variety of industrial applications, including automobiles. For example, ethylene-propylene-diene rubbers are representative rubber raw materials which can be broadly applied to automobile body sealing parts of weather strips, e.g., window glass run channels and front/rear glass moldings.

From the viewpoint of low costs and weight saving of automobile parts, a number of studies on lightweight rubber parts such as weather strip solids have been actively undertaken in automobile manufacturing industries. In particular, for the purpose of weight saving of rubber parts, there have been studies on the manufacture of microporous rubber extruded products through microfoaming of weather strip solid extruded products.

A microporous rubber extruded product (e.g. weather strip solid extruded product) for weight saving of rubber parts is manufactured by adding a small amount of a heat decomposable blowing agent having a thermal decomposition temperature of 150~160° C. to a rubber compound. The microporous rubber extruded product thus manufactured has microfoamed cells formed therein and a specific gravity of 0.9~1.0. At this time, a crystalline polyolefin resin is further added to the rubber compound to improve the surface appearance of the extruded product while compensating for the deterioration in the hardness of the extruded product owing to the microfoaming. If the specific gravity of the extruded product drops to 0.9 or less, the surface appearance of the extruded product is worsened and appropriate hardness and strength required for weather strip solid parts cannot be attained. On the other hand, when the specific gravity exceeds 1.0, it is contradictory to the purpose of weight saving of parts.

The above-mentioned problems in connection with specific gravity can be solved by the addition of a crystalline polyolefin resin to an ethylene-propylene-diene rubber during compounding. In this case, it is important to supplement and improve poor miscibility at the interface between the ethylene-propylene-diene rubber and the crystalline polyolefin.

Although an ethylene-propylene-diene rubber produced from the ethylene-propylene-diene rubber composition by a microporous rubber extrusion process is advantageous in terms of weight saving of automobile rubber parts, it has limited applicability due to its non-polarity, and in practice has not yet been put to practical use. In particular, since ethylene-propylene-diene rubbers have poor cohesion and adhesion properties, they cannot exhibit satisfactory coating and adhesion to polar polymeric materials, such as a urethane coating on weather strip extruded product. A pretreatment process, e.g., primer coating, is required for better coating properties of the ethylene-propylene-diene rubber onto a urethane coating on a weather strip extruded products, However, this pretreatment process results in an increase in the final product cost and involves environmental contamination.

In order to improve the cohesion, adhesion and coating properties of an ethylene-propylene-diene rubber to a polar polymeric material, blending a non-polar ethylene-propylene-diene rubber with a polar thermoplastic polymer, such as poly(styrene-co-acrylonitrile) (SAN) or poly(methyl methacrylate) PMMA, has been proposed. However, since the ethylene-propylene-diene rubber is different from the polar thermoplastic polymer in terms of its polarity, it has limited miscibility with the polymeric material, which creates additional manufacturing costs.

Recent research on the blending of ethylene-propylene-diene rubbers has predominantly focused on variations in mechanical properties and morphology of the rubbers. However, there have been few systematic studies regarding the improvement of cohesion, adhesion and coating properties of raw materials of the ethylene-propylene-diene rubbers until now.

SUMMARY OF THE INVENTION

The present inventors have earnestly and intensively conducted research to solve the above-mentioned problems. As a result, the present inventors have found that since an ethylene-propylene-diene rubber composition comprising an EPDM rubber, a crystalline polyolefin, and a polyolefin containing at least one carbonyl group (—C=O) within the structure as an adhesion improver is polar due to the presence of the carbonyl group, it improves adhesion to a polar polymeric material, resulting in improved coating and adhesion properties of rubber parts and extruded products, and satisfying the requirement of weight saving of rubber parts for use in industrial applications, including automobiles.

That is, it is an object of the present invention to provide an ethylene-propylene-diene rubber composition which can improve adhesion to a polar polymeric material.

In order to accomplish the above object of the present invention, there is provided an ethylene-propylene-diene EPDM rubber composition with improved adhesion properties which comprises an EPDM rubber as a main component, a crystalline polyolefin resin and a polyolefin containing at least one carbonyl group containing at least one carbonyl group (—C=O) within the structure as an adhesion improver. The three components contained in the composition of the present invention are mixed with each other to form a "polymer alloy", which is similar to a metal alloy.

Specifically, the composition of the present invention comprises 100 phr (parts per hundred rubber) of an EPDM rubber, 5~40 phr of a polyolefin containing at least one carbonyl group (—C=O) and 10~30 phr of a crystalline polyolefin resin.

The EPDM rubber used as a main component of the composition according to the present invention consists of 55~70 wt % of ethylene, 2~9 wt % of a diene and the balance of propylene. The present inventors have found that the EPDM rubber consisting of the three monomers within the content ranges defined above is most suitable to accomplish the object of the present invention.

As the diene, 5-ethylidene-2-norbornene (ENB) or dicyclopentadiene may be used.

The polyolefin containing at least one carbonyl group imparts polarity to the non-polar EPDM rubber and improves the miscibility between the non-polar rubber and a polar polymeric material. Accordingly, the polyolefin is used to improve the coating and adhesion properties of the non-polar rubber, and at the same time, to improve the compatibility between the respective polymeric phases upon polymer alloy processing.

The polyolefin containing at least one carbonyl group can be obtained by polymerizing a polymer containing a carbonyl group and a polyolefin in accordance with a conventional polymerization process.

preferred examples of carbonyl groups contained in the polyolefin include carboxylic acid, maleic acid, fumaric acid, acrylic acid, methacrylic acid, itaconic acid, crotonic acid, α-methyl crotonic acid, cinnamic acid, and anhydrides, esters, salt derivatives, metal salts and non-metal salts of these acids. The carbonyl group further includes glycidyl methacylate, glycidyl acrylate and other glycidyl compounds.

For example, the polyolefin containing at least one carbonyl group can be obtained by graft polymerizing a single-chain polyolefin, and 0.5~7% by weight of a maleic anhydride containing two carbonyl groups, based on the weight of the polyolefin.

As the polyolefin capable of imparting polarity to the EPDM rubber, an EPDM rubber containing at least one carbonyl group (hereinafter, abbreviated as a "modified ethylene-propylene-diene (EPDM) rubber") can be used. The modified EPDM rubber may be the same as the EPDM rubber used as the main component of the composition according to the present invention.

When the polyolefin containing at least one carbonyl group is used in an amount smaller than 5 phr relative to 100 phr of the EPDM rubber, its inherent functions are not sufficiently effected during processing, causing insufficient impartment of polarity to the final rubber composition. When the polyolefin is used in an amount exceeding 40 phr, the properties inherent to the EPDM rubber as a main component of the composition according to the present invention are deteriorated. Accordingly, it is most preferred that the content of the polyolefin containing at least one carbonyl group is limited to 50~40 phr, relative to 100 phr of the EPDM rubber.

The EPDM rubber composition of the present invention can attain better surface appearance and higher extrusion speed than the EPDM rubber alone, due to the presence of the crystalline polyolefin resin. This is because the crystalline polyolefin resin is plasticized at a certain processing temperature upon rubber extrusion, and is then transferred to the surfaces of the extruded products. In addition, a blowing agent may be added to the rubber composition of the present invention to form microfoamed cells inside the rubber, thereby compensating for the deterioration in the hardness of the lightweight rubber.

The crystalline polyolefin resin used in the present invention preferably has a melt index of about 0.3~0.45. As the crystalline polyolefin resin, at least one polyolefin selected from low density polyethylenes (LDPEs, high density polyethylenes (HDPEs), linear low density polyethylenes (LLDPEs) and polypropylenes (PPs) may be used.

When the crystalline polyethylene is used in an amount smaller than 10 phr relative to 100 phr of the EPDM rubber, the EPDM rubber produced from the rubber composition of the present invention cannot attain excellent surface appearance and high extrusion speed. When the crystalline polyethylene is used in an amount exceeding 30 phr, there is a risk that the low-temperature characteristics of the EPDM rubber may be deteriorated. Accordingly, it is preferred that the content of the crystalline polyethylene is limited to 10~30 phr relative to 100 phr of the EPDM rubber.

On the other hand, the rubber produced from the ethylene-propylene-diene (EPDM) rubber composition of the present invention comprising the polyolefin containing at least one carbonyl group and the crystalline polyolefin resin can be used as a material for industrial rubber parts, including automobile body sealing parts of weather strips, e.g., window glass run channels and front/rear glass moldings, tire tubes, wires, hoses, belts and the like.

In addition to the EPDM rubber, the polyolefin containing at least one carbonyl group and the crystalline polyolefin resin, the EPDM rubber composition of the present invention may further comprise other customary additives selected from fillers, activating agents, antioxidants, process oils, vulcanization agents and vulcanization accelerators. The kind of these additives may be properly selected and used in appropriate amounts. However, since these additives are components commonly used in conventional EPDM rubber compositions and are not essential components of the EPDM rubber composition according to the present invention, details concerning these additives will not be described below.

BRIEF DESCRIPTION OF THE DRAWINGS

The above and other objects, features and other advantages of the present invention will be more clearly understood from the following detailed description taken in conjunction with the accompanying drawing, in which.

DETAILED DESCRIPTION OF THE PREFERRED EMBODIMENT

Figure 1:
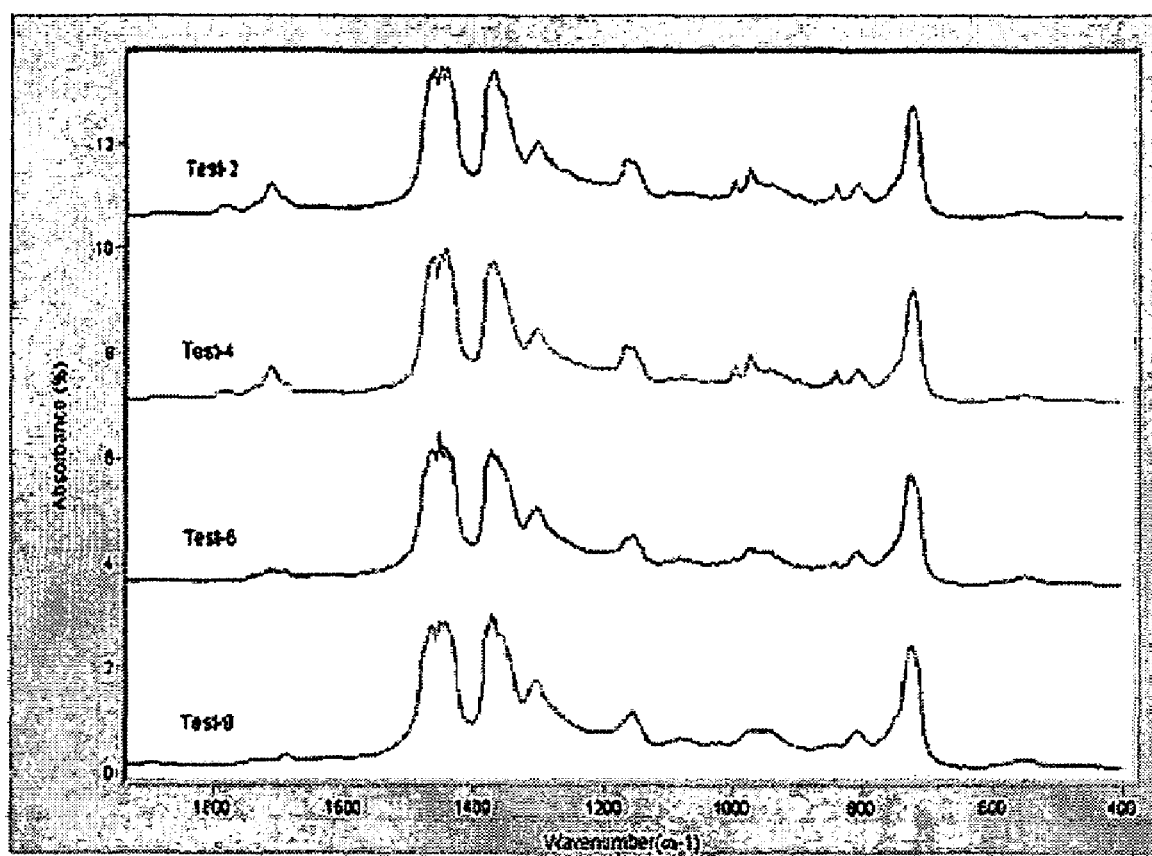
FIG. 1 is attenuated total reflection infrared (ATR-IR) spectra of polymer alloys TEST-2, TEST-4, TEST-6 and TEST-9 prepared in Example 1 of the present invention.

Hereinafter, the present invention will be described in more detail with reference to the following preferred examples. However, these examples are given for the purpose of illustration and are not to be construed as limiting the scope of the invention.

EXAMPLE 1

After an ethylene-propylene-diene (EPDM) rubber (KEP-281F, Kumho polychem Co., Ltd., Korea) and a crystalline low density polyethylene resin (C-PE) were charged into a banbury mixer, they were mixed in the mixer at a temperature not higher than the melting point of the crystalline polyethylene resin. The molten mixture was pelletized using an extruder to obtain pellets.

Thereafter, the pellets were melted with a modified ethylene-propylene-diene (EPDM) using a twin extruder to prepare polymer alloys TEST-1 to TEST-9 in a completely compatible state.

The EPDM, the crystalline polymer resin and the modified ethylene-propylene-diene rubber were mixed together in compliance with the respective compositions indicated in Table 1 below.

TABLE 1

| Polymer alloy No. | Compositions (unit: phr) | | | | | | |
|---|---|---|---|---|---|---|---|
| | EPDM[1] | Modified EPDM[2] | | | | Crystalline PE[3] | |
| | 100 | 5 | 10 | 20 | 40 | 20 | 30 |
| Test-1 | 0 | 0 | | | | 0 | |
| Test-2 | 0 | | 0 | | | 0 | |
| Test-3 | 0 | | | 0 | | 0 | |
| Test-4 | 0 | | | | 0 | 0 | |
| Test-5 | 0 | 0 | | | | | 0 |
| Test-6 | 0 | | 0 | | | | 0 |
| Test-7 | 0 | | | 0 | | | 0 |
| Test-8 | 0 | | | | 0 | | 0 |
| Test-9 | 0 | | | | | | 0 |

[1]Ethylene-propylene-diene rubber (KEP-281F, Kumho Polychem Co., Ltd., Korea)
[2]Modified ethylene-propylene-diene rubber produced by graft polymerizing the ethylene-propylene-diene rubber and 5% by weight of maleic anhydride containing two carbonyl groups relative to the weight of the EPDM rubber.
[3]Crystalline polyethylene having a melt index of 0.4.

The absorbance of the polymer alloys TEST-1 to TEST-9 shown in Table 1 was measured at a depth of 0.25~1.56 μm from the surface of the polymer alloys by ATR-IR (Attenuated Total Reflectance Infrared) spectroscopy. The results are shown in Table 2 below.

IR peaks corresponding to a carbonyl group (—C=O) were observed at around 1700 cm$^{-1}$. At this time, the depth at which the absorbance measurements were performed by ATR-IR spectroscopy was about 0.9 μm.

The attenuated total reflection infrared (ATR-IR) spectra of polymer alloys TEST-2, TEST-4, TEST-6 and TEST-9 prepared above are shown in FIG. 1.

TABLE 2

Analytical results of surface compositions (—C=O peak: 1700 cm$^{-1}$)

| | Unit | Test-1 | Test-2 | Test-3 | Test-4 | |
|---|---|---|---|---|---|---|
| EPDM | phr | 100 | 100 | 100 | 100 | |
| Modified EPDM | | | 5 | 10 | 20 | 40 |
| Crystalline PE | | 20 | 20 | 20 | 20 | |
| Absorbance | % | 0.21 | 0.54 | 0.51 | 0.50 | |

| | unit | Test-5 | Test-6 | Test-7 | Test-8 | Test-9 |
|---|---|---|---|---|---|---|
| EPDM | phr | 100 | 100 | 100 | 100 | 100 |
| Modified EPDM | | 5 | 10 | 20 | 40 | 0 |
| Crystalline PE | | 30 | 30 | 30 | 30 | 30 |
| Absorbance | % | 0.28 | 0.46 | 0.58 | 0.55 | 0.00 |

From Tables 1 and 2, and FIG. 1, it is clearly confirmed that carbonyl groups (—C=O) were introduced into the surfaces of the ethylene-propylene-diene rubber compositions by the addition of the modified ethylene-propylene-diene rubber containing carbonyl groups to the ethylene-propylene-diene rubber.

Meanwhile, as can be seen from Tables 1 and 2, FIG. 1, the distribution of carbonyl groups is correlated with the contents of the modified ethylene-propylene-diene rubber and the crystalline polyethylene resin. It was confirmed that although the content of the modified ethylene-propylene-diene rubber is increased to equal the content of the crystalline polyethylene resin, the transfer of carbonyl groups to the surfaces of the compositions is limited. This is because the limited transfer is closely related to the flowability of the crystalline polyethylene resin. Accordingly, the distribution of polar groups on the surfaces of the polymer alloys can be controlled depending on the composition and morphology of the polymer alloys, and processing conditions,

EXAMPLE 2

5 phr of zinc oxide, 1 phr of stearic acid, 140 phr of carbon black (FEF), 90 phr of a process oil, 2 phr of polyethylene glycol (PEG), 5 phr of calcium oxide, 7 phr of a vulcanization accelerator, 2 phr of sulfur and 0.1 phr of a blowing agent were added to TEST-2, TEST-4, TEST-6, TEST-8 and TEST-9 prepared in Example 1 in separate banbury mixers (FARREL 4.2 Banbury Mixer, 65 rpm) to prepare rubber formulations Alloy 1 to Alloy 5, respectively.

The compositions of Alloy 1 to Alloy 5 are shown in Table 3 below.

For comparison, a common EPDM rubber was used (Comparative Examples 1 and 2).

TABLE 3

Compositions of Comparative Examples and polymer alloys (unit: phr)

| Components | Comparative Example 1 | Comparative Example 2 | Alloy 1 | Alloy 2 | Alloy 3 | Alloy 4 | Alloy 5 |
|---|---|---|---|---|---|---|---|
| EPDM[1] | 120 | — | — | — | — | — | — |
| EPDM[1] | — | 120 | — | — | — | — | — |
| Test-2 sample | — | — | 120 | — | — | — | — |
| Test-4 sample | — | — | — | 120 | — | — | — |
| Test-6 sample | — | — | — | — | 120 | — | — |
| Test-8 sample | — | — | — | — | — | 120 | — |
| Test-9 sample | — | — | — | — | — | — | 120 |
| Zinc oxide | 5 | 5 | 5 | 5 | 5 | 5 | 5 |
| Stearic acid | 1 | 1 | 1 | 1 | 1 | 1 | 1 |
| Carbon black (FEF) | 140 | 140 | 140 | 140 | 140 | 140 | 140 |
| Process oil | 90 | 90 | 90 | 90 | 90 | 90 | 90 |
| PEG | 2 | 2 | 2 | 2 | 2 | 2 | 2 |
| Calcium oxide (CaO) | 5 | 5 | 5 | 5 | 5 | 5 | 5 |
| Vulcanization accelerator[2] | 7 | 7 | 7 | 7 | 7 | 7 | 7 |
| Sulfur | 2 | 2 | 2 | 2 | 2 | 2 | 2 |
| Blowing agent[3] | — | 0.1 | 0.1 | 0.1 | 0.1 | 0.1 | 0.1 |

[1]EPDM: KEP-281F, Kumho Polychem Co., Ltd., Korea
Mooney viscosity (ML1 + 8, 125° C.): 83
Ethylene content: 67.0 wt %
Diene (ENB; 5-ethylene-2-norbornene) content: 5.7 wt %
[2]Vulcanization accelerator: 1.5 phr of MBT (mercaptobenzothiazole), 2.0 phr of TMTDS (tetramethylthiuram disulfide), 1.0 phr of DPTT (dipentamethylthiuram tetrasulfide), 1.0 phr of TeEDC (tellurium diethyldithiocarbamate) and 1.5 phr of BZ (ZnBDC; zinc di-n-butyldithiocarbamate)
[3]Blowing agent
Decomposition Temperature: 130~160° C.
Gas: $N_2$, 110~125 cc/g In order to identify the coating adhesion properties of the rubber formulations prepared above, a coating test was conducted using urethane as a main component. In addition, following impartment of microporosity to Comparative Examples 1 and 2 and Alloy 1~Alloy 5, specific gravity, hardness, extrusion speed and low temperature compression set rate were measured in order to clearly confirm the functions of the EPDM rubber composition according to the present invention (Table 4).

This test was conducted by a continuous extrusion process for weather strip solid profile compounds, and details concerning the test are as follows:

(1) Weather strip solid profile compound conditions
   Compound formulation: see Table 3
   Mixing: FARREL 4.2 Banbury Mixer, 65 rpm
   Fill factor: 75% (NCV 4.24 L)
   Mixing procedure: 130° C., 4'30" Mixing
(2) Extrusion conditions
   Twin extruder: 45 rpm, HAV Hot Air 220° C.
   Die: Cross-section width: 20 mm, thickness: 1.5 mm
   Screw RPM:
(3) Urethane coating process
   A urethane resin was used as a main component. In this test, a pretreatment process such as primer coating was omitted. After extrusion, the urethane resin and a curing agent were applied onto the vulcanized rubbers using a sprayer, and then the resulting structures were cut into sample specimens (100 mm)).
(4) Evaluation of urethane coating: Evaluation of coating adhesion properties
   Wear resistance test: This is carried out under a load of 1 Kg (glass wear paper for automobiles)
   Thickness measurement of urethane coating (relative evaluation)
(5) Specific gravity, hardness, and compression set rate: JIS K 6301

Accordingly, since the ethylene-propylene-diene (EPDM) rubber composition of the present invention is polar due to the presence of the carbonyl group, it improves adhesion to polar polymeric materials, resulting in improved coating and adhesion properties of rubber parts and extruded products, and satisfying the requirement of weight saving of rubber parts for use in industrial applications, including automobiles.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An ethylene-propylene-diene (EPDM) rubber composition with improved adhesion properties, comprising:
   an EPDM rubber;
   a crystalline polyolefin resin; and
   an ethylene-propylene-diene containing at least one carbonyl group within the structure as an adhesion improver, wherein the ethylene-propylene-diene containing at least one carbonyl group is present in an amount of 5~40 phr, based on 100 phr of the EPDM rubber.

2. The ethylene-propylene-diene rubber composition according to claim 1, wherein the ethylene-propylene-diene rubber consists of 5~70 wt % of ethylene, 2~9 wt % of a diene and the balance of propylene.

3. The ethylene-propylene-diene rubber composition according to claim 1, wherein the crystalline polyolefin resin is at least one polyolefin selected from low density polyethylenes (LDPEs), high density polyethylenes (HDPEs), linear low density polyethylenes (LLDPEs) and polypropylenes (PPs).

4. The ethylene-propylene-diene rubber composition according to claim 2, wherein the diene is 5-ethylidene-2-norbornene (ENB) or dicyclopentadiene.

TABLE 4

Properties of Comparative Examples and polymer alloy rubbers

| Rubbers | Coating adhesion properties | | Extrusion properties | | Physical properties | | |
|---|---|---|---|---|---|---|---|
| | Wear resistance test[1] | Thickness (μm) | Extrusion speed (m/min) | Surface[2] | Specific gravity | Hardness | C-Set (%)[3] |
| Comparative Example 1 | — | — | 2.5 | B | 1.092 | 70 | 27 |
| Comparative Example 2 | — | — | 2.5 | C | 0.913 | 61 | 27 |
| Alloy 1 | □ | 20 | 2.9 | A | 0.921 | 78 | 35 |
| Alloy 2 | □ | 18 | 2.8 | A | 0.958 | 76 | 40 |
| Alloy 3 | □ | 17 | 3.1 | A | 0.932 | 77 | 51 |
| Alloy 4 | □ | 18 | 2.8 | A | 0.982 | 77 | 53 |
| Alloy 5 | — | — | 2.8 | A | 0.915 | 76 | 30 |

[1]Wear test: No wear marks were observed (○), and wear marks not larger than 5 μm were observed (◇)
[2]Surface (visual examination): A > B > C
[3]Low temperature compression set rate: −20° C., 22 hours As can be seen from the results shown in Tables 1 to 4, since the ethylene-propylene-diene (EPDM) rubber composition of the present invention contains a polar carbonyl group (—C=O), rubbers produced from the composition exhibit improved adhesion to polar polymeric materials and good surface appearance.

5. An industrial rubber part produced from the ethylene-propylene-diene rubber composition according to claim 1.

6. The industrial rubber part according to claim 5, wherein the rubber part is selected from automobile body sealing parts, tire tubes, wires, hoses and belts.

* * * * *